US00RE35684E

United States Patent [19]

Maeng

[11] E Patent Number: Re. 35,684

[45] Reissued Date of Patent: Dec. 9, 1997

[54] GOLF BAG WITH SUPPORT STAND

[76] Inventor: Seop Maeng, Hanyang Apt. 22-102,, Songpa-Dong, Songpa-Ku, Seoul, Rep. of Korea

[21] Appl. No.: 316,392

[22] Filed: Sep. 30, 1994

Related U.S. Patent Documents

Reissue of:

[64] Patent No.: 5,152,483
Issued: Oct. 6, 1992
Appl. No.: 791,481
Filed: Nov. 12, 1991

[30] Foreign Application Priority Data

May 13, 1991 [KR] Rep. of Korea ..... 6800/1991
May 13, 1991 [KR] Rep. of Korea ..... 6801/1991

[51] Int. Cl.[6] ..... A63B 55/10
[52] U.S. Cl. ..... 248/96; 206/315.7
[58] Field of Search ..... 248/96; 206/315.7

[56] References Cited

U.S. PATENT DOCUMENTS 1,197,298 9/1916 McGregor ..... 248/96
1,757,471 5/1930 Platt ..... 248/96
4,834,235 5/1989 Solheim et al. ..... 248/964
4,921,192 5/1990 Jones ..... 248/96

*Primary Examiner*—Alvin C. Chin-Shue
*Attorney, Agent, or Firm*—John J. Connors; Connors & Assoc.

[57] ABSTRACT

A golf bag comprising a pair of legs each and a U-shaped actuating member adapted to move the legs between their extended position and their retracted position according to the movement of a bag body between its tilted position and its upright position. The golf bag also comprises a driving member pivotally connected to both of the lower end of the U-shaped actuating member and the lower portion of the bag body and adapted to drive the actuating member in response to the movement of the bag body to its tilted position so that the actuating member moves the legs to their extended position. A resilient rubber band is provided for always urging the legs toward their retracted position. The actuating member may be installed in the interior of golf bag, there is no possibility that it is damaged by stones or branches of a tree.

4 Claims, 6 Drawing Sheets

FIG. 1A
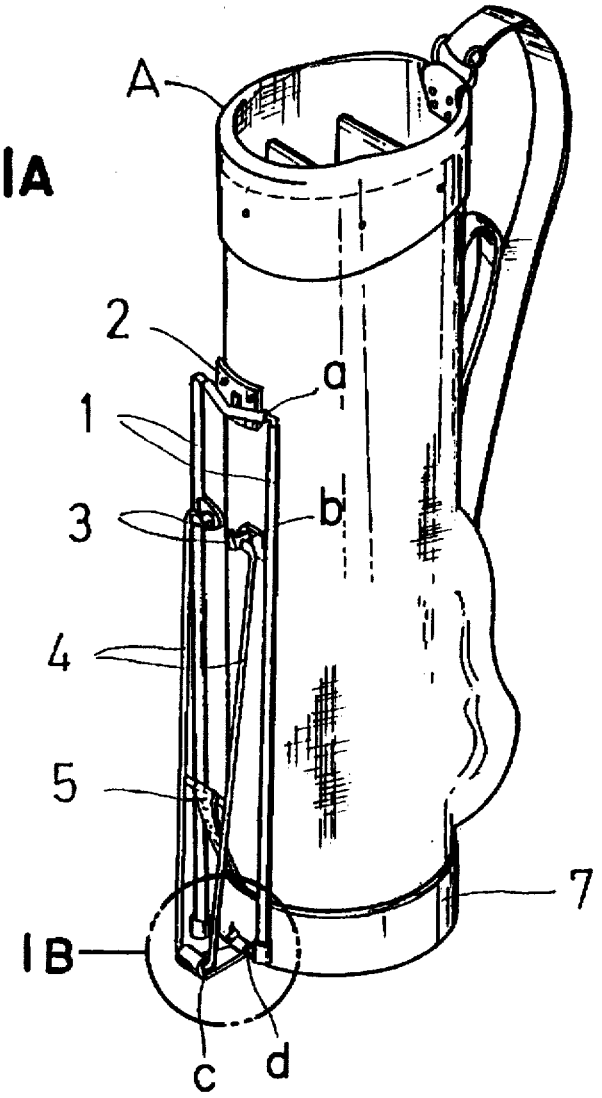
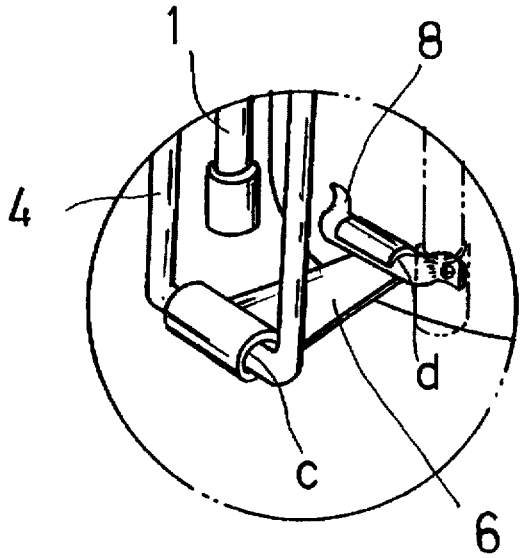
FIG. 1B

FIG. 2
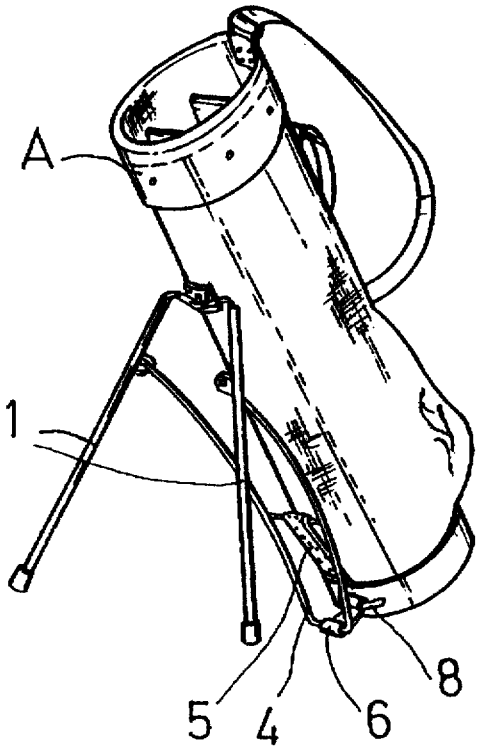
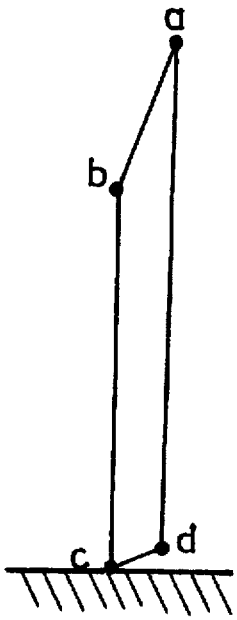
FIG. 3A
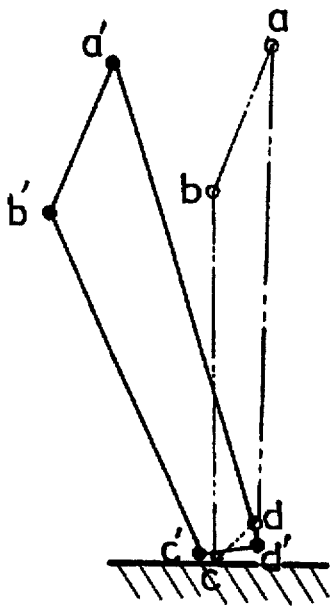
FIG. 3B

GOLF BAG WITH SUPPORT STAND

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to golf bags, and more particularly to golf bags with support stands wherein a pair of legs are movable between their extended position and their retracted position.

2. Description of the Prior Art

Conventionally, there have been proposed various golf bags which have legs movable between their extended and retracted positions. Such type of golf bags are disclosed in U.S. Pat. Nos. 4,676,464 and 4,921,192. For example, U.S. Pat. No. 5,676,464 disclosed a golf bag with an integral strand which comprises a pair of legs pivotally mounted at the upper ends thereof on the upper portion of golf bag, a pair of shoulder pads connected at the upper ends thereof to the uppermost ends of the legs, respectively, and a pair of clamps fixedly mounted to the lower ends of the shoulder pads and adapted to fit around and slide along the legs, respectively. As the shoulder pads are lifted for carrying the golf bag, the clamps slide upwardly along the legs, thereby causing the legs to be retracted. On the other hand, the shoulder pads are free, the lower ends of the shoulder pads made of an elastic material such as nylon codes are extended by virtue of their elasticity, so that the clamps slide and push the legs, thereby causing the legs to extend in order to function as a stand. Thus, this construction has improved convenience in use, over the prior arts, because the legs are automatically retracted in carrying the golf bag and automatically extended in using or storage thereof.

However, this construction has inconvenience in storage, since even in storage, the legs are automatically extended. Also, to carry or store the golf bag under the condition of extending the legs causes the necessity of large space, thereby the transportation efficiency to be decreased. Furthermore, the construction should have a base member of special shape which makes impossible to apply the construction to most commonly used golf bags.

In U.S. Pat. No. 4,921,192, a front half portion of the base of the bag is formed inclinedly so that as the inclined base portion is brought into contact with the ground, a vertically extending actuating rod, which is disposed at the side of bag adjacent the inclined base portion and is movable upwardly and downwardly, is lifted to extend legs. This construction also have the disadvantage that it can not be used in general types of golf bags, because of requiring the inclined base. Furthermore, this inclined base causes the disadvantage that the golf bag falls down easily, in that the ground contact area thereof is only a part of the bottom surface of the base. In the case that golf clubs are contained in the golf bag, it is difficult to maintain the golf bag at its upright position, because only the horizontal surface of the base should support the heavy weights of golf clubs. As a result, the golf bag is naturally maintained at its inclined position where the inclined surface of the base is in contact with the ground and legs are maintained at their extended position. Consequently, the golf bag can be hardly stored at its upright position under the condition of containing golf clubs therein. Large storage is also needed, in that in storage, the legs are naturally maintained at their extended position.

In the above-mentioned construction, there is also a disadvantage of requiring a special inner construction which prevents handles of golf clubs contained in the bag from sliding along the inner inclined surface of the base at the upright position of the bag.

Although above-mentioned patents are mainly intended for improving the stability of golf bag at the extended position of the legs, by increasing the ground contact area of the base, the constructions required therefor rather causes another serious disadvantages mentioned above.

In order to overcome the disadvantages encountered in the above-mentioned patents, an improved golf bag has been proposed in the Korean Utility Model Application Nos. 90-2102 filed by the applicant on Feb. 26, 1990. The golf bag comprises a L-shaped actuating member provided at the lower end of a vertical movable member operatively connected to support legs. As the golf bag is tilted to allow golf clubs to be easily removed and reinserted into the bag, the L-shaped actuating member is lifted up, in virtue of the weight of tilted bag, thereby causing the legs to be extended.

When the golf bag having the above construction is carried or stored, it can be maintained in its upright position, thereby enabling its occupied space to be minimized. In use, legs are extended only by the force generate as the golf bag moves to its tilted position, without any manipulation, so that the golf bag can be stably maintained in its tilted position. In the above-mentioned construction, however, the vertical movement length of the actuating member may vary depending on the ground condition, thereby causing the legs to be extended excessively or insufficiently. Furthermore, the L-shaped actuating member may be easily damaged or transformed. The damaged or transformed actuating member makes the overall support stand useless. There is also disadvantages of complicated construction and expensive manufacture cost.

SUMMARY OF THE INVENTION

Therefore, an object of the present invention is to overcome the above-mentioned disadvantages encountered in the prior arts and to a golf bag with a support stand wherein legs can be easily extended by their weights as the bag moves to its position and automatically retracted as the bag moves to its upright position.

Another object of the present invention is to provide a golf bag with a support stand which can be easily applied to various types of existing golf bags, without requiring any separate construction.

A further object of the present invention is to provide a golf bag with a support having a simple construction.

In accordance with the present invention, there objects can be accomplished by providing a golf bag comprising a bag body provided at one side thereof with a handle, a pivot member attached to the upper portion of the other side said bag body, a pair of legs each pivotally attached at its upper end to said pivot member, said upper end being bent at 90° with respect to the rest of leg, and a U-shaped actuating member adapted to move the legs between their extended position and their retracted position according to the movement of the bag body its tilted position and its upright position, said golf bag further comprising: driving means pivotally connected to both of the lower end of said U-shaped actuating member and the lower portion of said other side of bag body and adapted to drive the actuating member in response to the movement of the bag body to its tilted position so that the actuating member moves the legs to their extended position; connection adapted to pivotally connect both upper ends of the actuating member with respective legs; and resilient means adapted to always urge the legs toward their retracted position.

In one aspect of the present invention, the driving means comprises a horizontal drive member having an inner end pivotally connected to a fixed member fixedly mounted to the lower portion of the other side of bag body and outer end pivotally connected to the lower end of the U-shaped actuating member. The connection means comprises a pair of connecting members each having an inner end fixed to the upper portion of the corresponding leg at the position below the upper end of the leg and an outer end pivotally connected to the corresponding upper end of the actuating member. The resilient means comprises a resilent rubber band having an upper end connected to the middle portion of the actuating member and a lower end connected to the lower portion of the other side of bag body.

In another aspect of the present invention, the driving means comprises a drive member having.a center pivot portion pivotally connected to a fixed member fixedly mounted to the lower portion of the other side of bag body, an outer horizontal portion extending horizontally and outwardly from the center pivot portion and an inner vertical portion extending upwardly and toward the interior of the bag body, the inner vertical portion having an upper end pivotally connected to the lower end of the actuating member. The connection means comprises a pair of connecting members each fixed to an end extending from the upper end of the corresponding leg toward the interior of the bag body, each of the connecting members having an inner end pivotally connected to the corresponding upper end of the actuating member. The resilient means comprises a resilient rubber band having an upper end connected to the upper portion of the upper portion of the other side of bag body and a lower end connected to the upper ends of the actuating member.

BRIEF DESCRIPTION OF THE DRAWINGS

Other objects and advantages of the present invention will become apparent from the following description of embodiments with reference to the accompanying drawings in which:

FIG. 1 is a perspective view of a golf bag with a support stand in accordance with an embodiment of the present invention, which bag is maintained at its upright position;

FIG. 2 is a perspective view of the golf bag of FIG. 1, showing the condition that the bag is maintained at its tilted position;

FIG. 3A is a schematic view showing a parallelogram formed when the bag is maintained at its upright position;

FIG. 3B is a schematic view showing a parallelogram formed when the bag is maintained at its tilted position;

DETAILED DESCRIPTION OF THE PREFERRED EMBODIMENTS

Figures 4A, 4B:
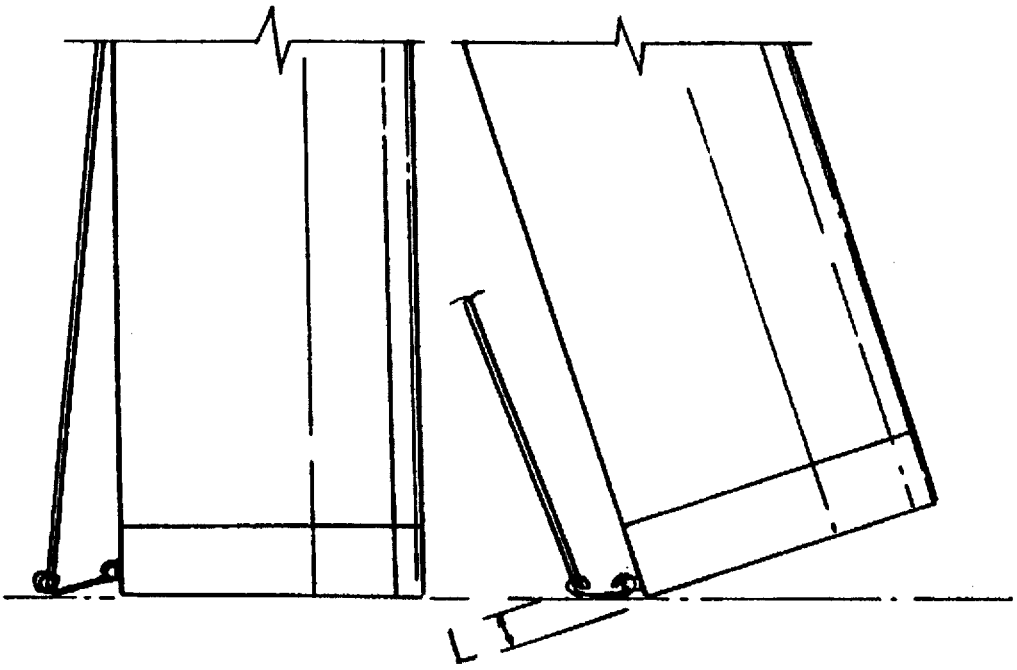
FIG. 4A is a partial side view of the golf bag showing the condition when the bag is maintained at its upright position.
FIG. 4B is a partial side view of the golf bag showing the condition when the bag is maintained at its tilted position.

Referring to FIG. 1, there is shown a golf bag with a support stand in accordance with an embodiment of the present invention. The golf bag comprises a bag body A provided with a handle at one side thereof, that is, the right side of the drawing. To the other side of the bag body A, a pair of support legs 1 are pivotally mounted at their upper ends by means of a pivot member or a bracket 2 attached to the bag body A. For pivotally moving the legs 1 between their extended and retracted positions as the golf bag moves between its tilted and upright positions, the golf bag also comprises a generally U-shaped actuating member 4 pivotally connected with the legs 1. The pivotal connection between the actuating member 4 and the legs 1 is accomplished by a pair of connecting members 3. The actuating member 4 is movable upwardly and downwardly to move the legs 1 between extended and retracted positions thereof. Each connecting member 3 has an inner end fixed to the upper portion of the corresponding leg 1 at the position below the upper end of the leg 1 and an outer end pivotally connected to the corresponding upper end of the actuating member 4.

At the other side of the bag body A, a horizontal drive member 6 is pivotally mounted to a base 7 constituting the lower portion of the bag body A, by means of a fixed member 8 attached to the base 7. The drive member 6 extends horizontally and outwardly and is pivotally connected at its outer end with the lower end of the U-shaped actuating member 4.

In order to normally maintain the leg 1 at the retracted position thereof, a resilient member 5 is provided which is connected at its upper end to the actuating member 4 and at its lower end to the base 7 of the bag body A. The resilient member 5 comprises a resilient rubber band and functions to always urge the actuating member 4 downwardly, that is, in the direction of forcing the legs 1 to move to the retracted position thereof.

According to the above construction, a parallelogram link mechanism is formed, as shown in FIG. 3A. The link mechanism has four pivot points a to d and four links which are linked with one another at said pivot points a to d and provided by the legs 1, the actuating member 4, the drive member 6 and the bag body A, respectively.

The operation of the above-mentioned construction will now be described in conjunction with the link mechanism.

In the normal state that the golf bag is maintained at its upright position as shown in FIG. 1 and FIG. 4A, the drive member 6 which is pivotally connected to the base 7 is not depressed against the ground and is maintained horizontally, as shown in FIG. 1. In this state, the legs 1 are maintained at the retracted position thereof As the golf bag is moved toward the tilted position thereof, for its use on the field, the drive member 6 is depressed against the ground and pivotally moved in clockwise about the pivot point d and against the resilience of the resilient rubber band 5. By the pivotal movement of the drive member 6, the actuating member 4 is lifted a vertical distance L indicated in FIG. 4B. As a result, the leg 1 pivot in clockwise to the extended position thereof, so that the golf bag is stably maintained at its tilted position as shown in FIG. 2.

The pivoting of the legs 1 to the extended position thereof is accomplished in that the parallelogram having pivot points a, b, c and d as shown in FIG. 3A is changed into the parallelogram having pivot points a', b', c' and d' as shown in FIG. 3B. Since four side lengths of the former parallelogram is identical to those of the latter parallelogram, the sum of diagonal lengths of the former parallelogram is also identical to that of the latter parallelogram. Accordingly, the diagonal length between pivot points a and c is longer than that between pivot points a' and c', that is ac>a'c', while the diagonal length between pivot points b and d is shorter than that between pivot points b'd', that is bd<b'd'. As a result, the pivot point b shifts to the pivot point b', thereby causing the legs 1 to pivotally move to the extended position thereof. Since the golf bag can be stably maintained at its tilted position, golf clubs can be easily and conveniently takes out of the golf bag.

As the golf bag is moved to its upright position after using golf clubs, the legs 1 returns to the retracted position thereof, by virtue of the resilience of the resilient rubber band 5. Thus, the use of support stand is very convenient.

Figure 5A:
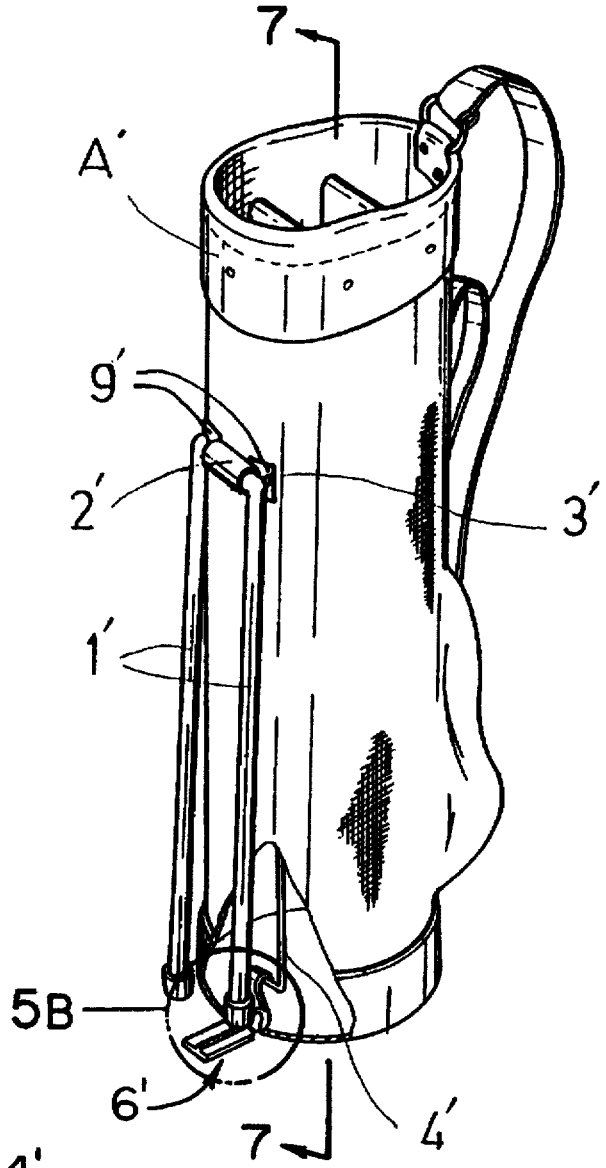
FIG. 5 is a perspective view of a golf bag with a support stand in accordance with another embodiment of the present invention, which bag is maintained at this upright position.
Figure 5B:
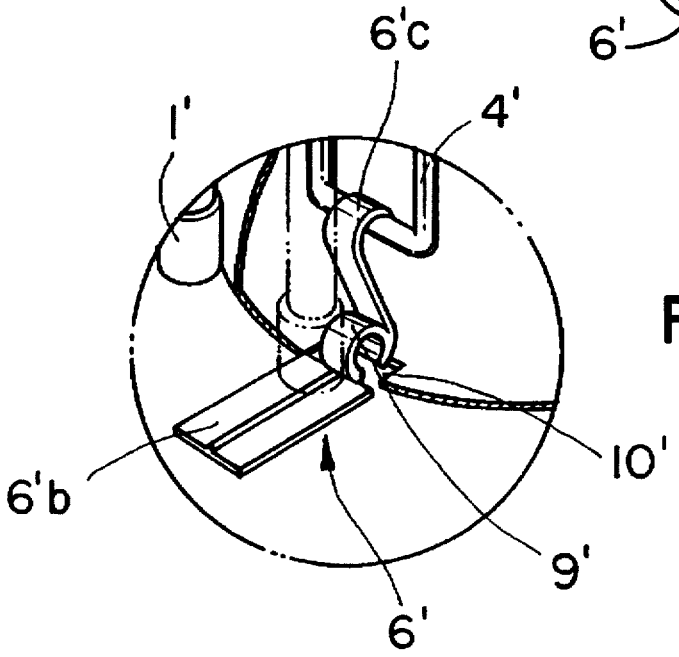
Figure 7:
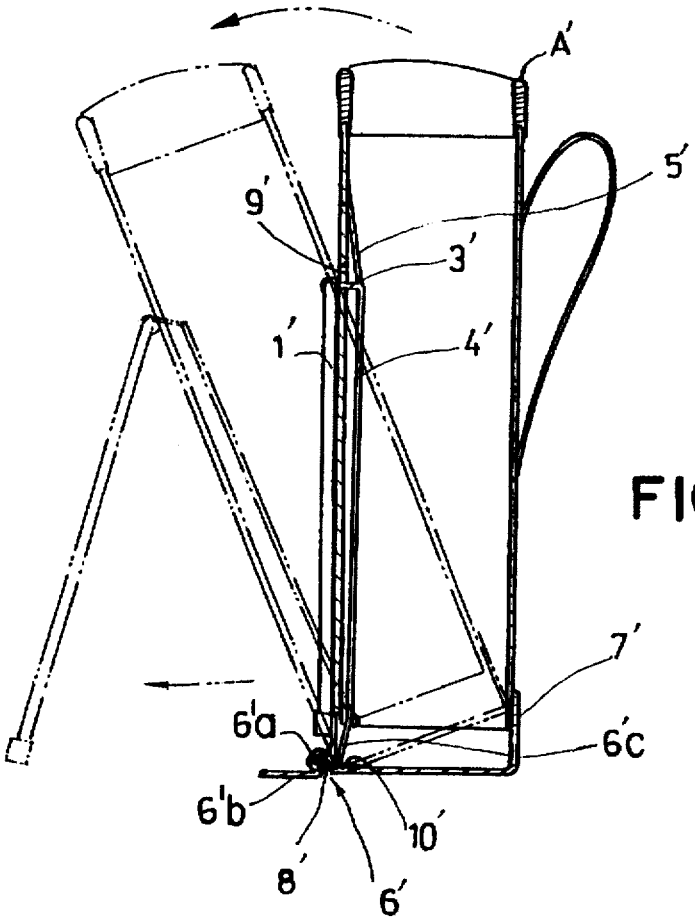
FIG. 7 is a cross-sectional view taken along the line X—X of FIG. 5.

Referring to FIG. 5, there is shown a golf bag with a support stand in accordance with another embodiment of the present invention. The golf bag comprises a bag body A' and a pair of support legs 1', in similar to those of the golf bag according to the previous embodiment. For pivotally moving the legs 1' between their extended and retracted positions as the golf bag moves between its tilted and upright positions, the golf bag also comprises a generally U-shaped actuating member 4' pivotally connected with the legs 1'. In contrast to the actuating member 4 of the previous embodiment, the actuating member 4' is disposed in the interior of the bag body A. Accordingly, the pivotal connection between the inner actuating member 4' and the outer legs 1' is accomplished by a pair of connecting members 3' extending through the wall of bag body A'. The actuating member 4' is movable downwardly and upwardly to move the legs 1' between extended and retracted positions thereof. This movement of the actuating member 4' is reverse to that of the actuating member 4. Each connecting member 3' is fixed to the upper end of the corresponding leg 1' at the outside of the bag body A' and extends through a throughout hole 9' formed at the wall of the bag body A' so as to be connected at its inner end pivotally connected to the corresponding upper end of the actuating member 4', as shown in FIG. 7.

At the other side of the bag body A', a drive member 6' is pivotally mounted to a base 7', by means of a fixed member 8' attached to the base 7'. The drive member 6' has a center pivot portion 6'a pivotally connected to the fixed member 8' fixedly mounted to the base 7', an outer horizontal portion 6'b extending horizontally and outwardly from the center pivot portion 6'a and an inner vertical portion 6'c extending upwardly into the interior of the bag body. The inner vertical portion extends through a throughout hole 10' formed at the base 7' and has an upper end pivotally connected to the lower end of the actuating member 4' disposed in the interior of the bag body A'.

In order to normally maintain the legs 1' at the retracted position thereof, a resilient member 5' is provided which comprises a resilient rubber band adapted to always urge the actuating member 4' upwardly, that is, in the direction of forcing the legs 1 to move to the retracted position thereof. The resilient member 5' has an upper end connected to the upper position of the other side of bag body A' and a lower end connected to the upper ends of the actuating member 4'.

The operation of the above mentioned construction according to the second embodiment will now be described.

Figure 8A:
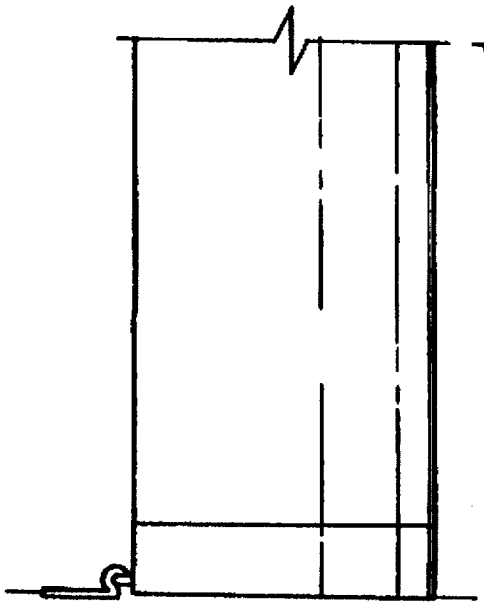
FIG. 8A is a partial side view of the golf bag of FIG. 5 showing the condition when the bag is maintained at its upright position.
Figure 8B:
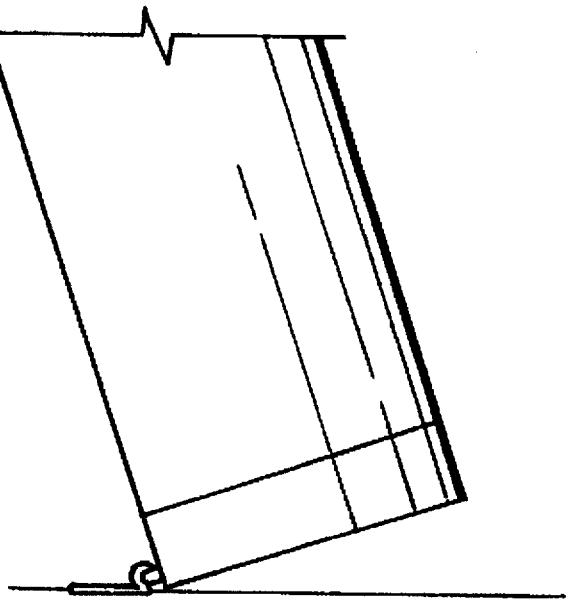
FIG. 8B is a partial side view of the golf bag of FIG. 5 showing the condition when the bag is maintained at its tilted position.

In the normal state that the golf bag is maintained at its upright position as shown by the solid line in FIG. 7 and FIG. 8A, the outer horizontal portion 6'b of drive member 6' is not depressed against the ground and is maintained horizontally. In this state, the legs 1' are maintained at the retracted position thereof.

Figure 6A:
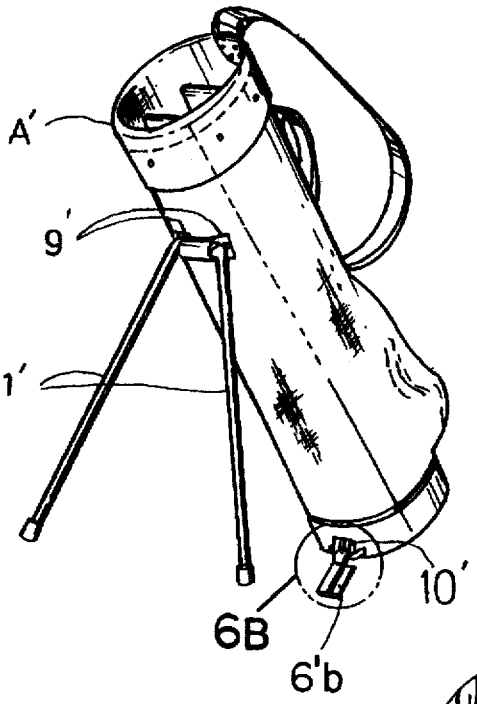
FIG. 6 is a perspective view of the golf bag of FIG. 5, showing the condition that the bag is maintained at its tilted position.
Figure 6B:
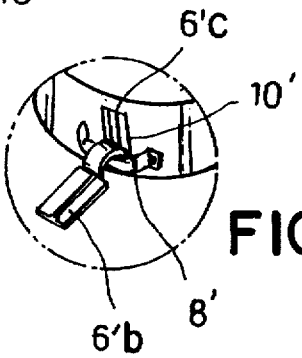

As the golf bag is moved toward the tilted position thereof, for its use on the field, the drive member 6' is depressed at its outer horizontal portion against the ground and pivotally moved in clockwise and against the resilience of the resilient rubber band 5. By the pivotal movement of the drive member 6, the actuating member 4 is lowered by the inner vertical portion 6'b drive member 6'. As a result, the legs 1' pivot in clockwise to the extended position thereof, so that the golf bag is stably maintained at its tilted position as shown in FIG. 6 and by the phantom line in FIG. 7. Since the golf bag can be stably maintained at its tilted position, golf clubs can be easily and conveniently taken out of the golf bag.

As the golf bag is moved to its upright position after using golf clubs, the legs 1' returns to the retracted position thereof, by virtue of the resilience of the resilient rubber band 5'. Thus, the use of support stand is very convenient.

As apparent from the above-description, the present invention provides a golf bag with a support stand wherein legs can be easily extended by their weights as the bag moves to its inclined position and automatically retracted as the bag moves to its upright position. In particular, the support stand of the present invention can be easily applied to various types of existing golf bags, without requiring any separate construction. By virtue of the simplified construction, the failure of the support stand is hardly generated. In the case where operating members are disposed in the interior of golf bag, there is no possibility that they are damaged by stones or branches of a tree.

It must be understood that many alterations and modifications may be made by those having ordinary skill in the art to the structures disclosed herein without departing from the spirit and scope of the invention. Therefore, the presently illustrated embodiments have been shown only by way of example and should not be taken to limit the scope of the following claims.

What is claimed is:

[1. A golf bag comprising a bag body provided at one side thereof with a handle, a pivot member attached to the upper portion of the other side of said bag body, a pair of legs each pivotally attached at its upper end to said pivot member, said upper end being bent at 90° with respect to the rest of leg, and a U-shaped actuating member adapted to move the legs between their extended position and their retracted position according to the movement of the bag body between its tilted position and its upright position, said golf bag further comprising:

driving means pivotally connected to both of the lower end of said U-shaped actuating member and the lower portion of said other end of bag body and adapted to drive the actuating member in response to the movement of the bag body to its tilted position so that the actuating member moves the legs to their extended position;

connection means adapted to pivotally connect both upper ends of the actuating member with respective legs; and resilient means adapted to always urge the legs toward their retracted position.]

[2. A golf bag in accordance with claim 1, wherein said driving means comprises a horizontal drive member having an inner end pivotally connceted to a fixed member fixedly mounted to said lower portion of the other side of bag body and an outer end pivotally connected to the lower end of said U-shaped actuating member, said connection means comprises a pair of connecting members each having an inner end fixed to the upper portion of the corresponding leg at the position below the upper end of the leg and an outer end pivotally connected to the corresponding upper end of the actuating member; and said resilient means comprises a resilient rubber band having an upper end connected to the middle portion of the actuating member and a lower end connected to the lower portion of the other side of bag body.]

[3. A golf bag in accordance with claim 1, wherein said driving means comprises a drive member having a center pivot portion pivotally connected to a fixed member fixedly mounted to said lower portion of the other side of bag body, an outer horizontal portion extending horizontally and outwardly from said center pivot portion and an inner vertical portion extending upwardly and toward the interior of the bag body, said inner vertical portion having an upper end pivotally connected to the lower end of the actuating member; said connection means comprises a pair of connecting members each fixed to and extending from the upper end of the corresponding leg toward the interior of the bag body, each of said connecting member having an inner end pivotally connected to the corresponding upper end at the actuating member; and said resilient means comprises a resilient rubber band having an upper end connected to the upper portion of the upper portion of the other side of bag body and a lower end connected to the upper ends of the actuating member.]

*4. A golf bag comprising a bag body provided at one side thereof with a handle, a pivot member attached to the upper portion of the other side of said bag body, a pair of legs each pivotally attached at its upper end to said pivot member, said upper end being bent at 90° with respect to the rest of the leg, and a U-shaped actuating member adapted to move the legs between their extended position and their retracted position according to the movement of the bag body between its tilted position and its upright position, said golf bag further comprising:*

*driving means pivotally connected to both of the lower end of said U-shaped actuating member and the lower portion of said other side of bag body and adapted to drive the actuating member in response to the movement of the bag body to its tilted position so that the actuating member moves the legs to their extended position;*

*connection means adapted to pivotally connect both upper ends of the actuating member with respective legs; and*

*resilient means adapted to always urge the legs toward their retracted position;*

*said driving means comprises a horizontal drive member having an inner end pivotally connected to a fixed member fixedly mounted to said lower portion of the other side of bag body and an outer end pivotally connected to the lower end of said U-shaped actuating member;*

*said connection means comprises a pair of connecting members each having an inner end fixed to the upper portion of the corresponding leg at the position below the upper end of the leg and an outer end pivotally connected to the corresponding upper end of the actuating member; and*

*said resilient means comprises a resilient rubber band having an upper end connected to the middle portion of the actuating member and a lower end connected to the lower portion of the other side of the bag body.*

*5. A golf bag comprising a bag body provided at one side thereof with a handle, a pivot member attached to the upper portion of the other side of said bag body, a pair of legs each pivotally attached at its upper end to said pivot member, said upper end being bent at 90° with respect to the rest of the leg, and a U-shaped actuating member adapted to move the legs between their extended position and their retracted position according to the movement of the bag body between its tilted position and its upright position, said golf bag further comprising:*

*driving means pivotally connected to both of the lower end of said U-shaped actuating member and the lower portion of said other side of bag body and adapted to drive the actuating member in response to the movement of the bag body to its tilted position so that the actuating member moves the legs to their extended position;*

*connection means adapted to pivotally connect both upper ends of the actuating member with respective legs; and*

*resilient means adapted to always urge the legs toward their retracted position;*

*said driving means comprises a drive member having a center pivot portion pivotally connected to a fixed member fixedly mounted to said lower portion of the other side of the bag body, an outer horizontal portion extending horizontally and outwardly from said center pivot portion and an inner vertical portion extending upwardly and toward the interior of the bag body, said inner vertical portion having an upper end pivotally connected to the lower end or the actuating member;*

*said connection means comprises a pair of connecting members each fixed to and extending from the upper end of the corresponding leg toward the interior of the bag body, each of said connecting members having an inner end pivotally connected to the corresponding upper end of the actuating member; and*

*said resilient means comprises a resilient rubber band having an upper end connected to the upper portion of the upper portion of the other side of the bag body and a lower end connected to the upper ends of the actuating member.*

*6. A golf bag comprising*

*a bag body having a lower portion and an upper portion,*

*a pivot member attached to the upper portion of the bag body,*

*a pair of legs pivotally attached to said pivot member,*

*an actuating member having an upper end and a lower end, said upper end of the actuating member connected to the legs to move said legs between an extended position and a retracted position according to the movement of the bag body between a tilted position and an upright position,*

*a driving member pivotally connected to the lower end of said actuating member and the lower portion of the bag body which drives the actuating member in response to the movement of the bag body to the tilted position so that the actuating member moves the legs to their extended position, and*

*a resilient rubber band type member that urges the legs into the retracted position, said resilient member having one end connected to the lower portion of the the bag body and another end connected to an intermediate portion of the actuating member.*

*7. A golf bag comprising*

*a bag body having an upper portion and a lower portion, with said lower portion having a side and a bottom,*

*a pivot member attached to the upper portion of the bag body,*

*a pair of legs pivotally attached to said pivot member,*

*an actuating member having an upper end and a lower end, said upper end of the actuating member connected to the legs to move said legs between an extended position and a retracted position according to the movement of the bag body between a tilted position and an upright position,*

*a driving member extending outwardly from the side of the lower portion of the bag body which drives the actuating member in response to the movement of the bag body to the tilted position so that the actuating member moves the legs to their extended position,*

*said driving member including a drive plate having an inner end pivotally attached to the side of the lower portion of the bag body and above the bottom and an outer end pivotably connected to the lower end of the actuating member, and*

*a resilient member that urges the legs into the retracted position, returning said legs to the retracted position upon moving the bag from a tilted position to an upright position.*

* * * * *